May 24, 1927.
V. E. IVARSON
SPIRIT LEVEL
Filed Nov. 24, 1925
1,630,122
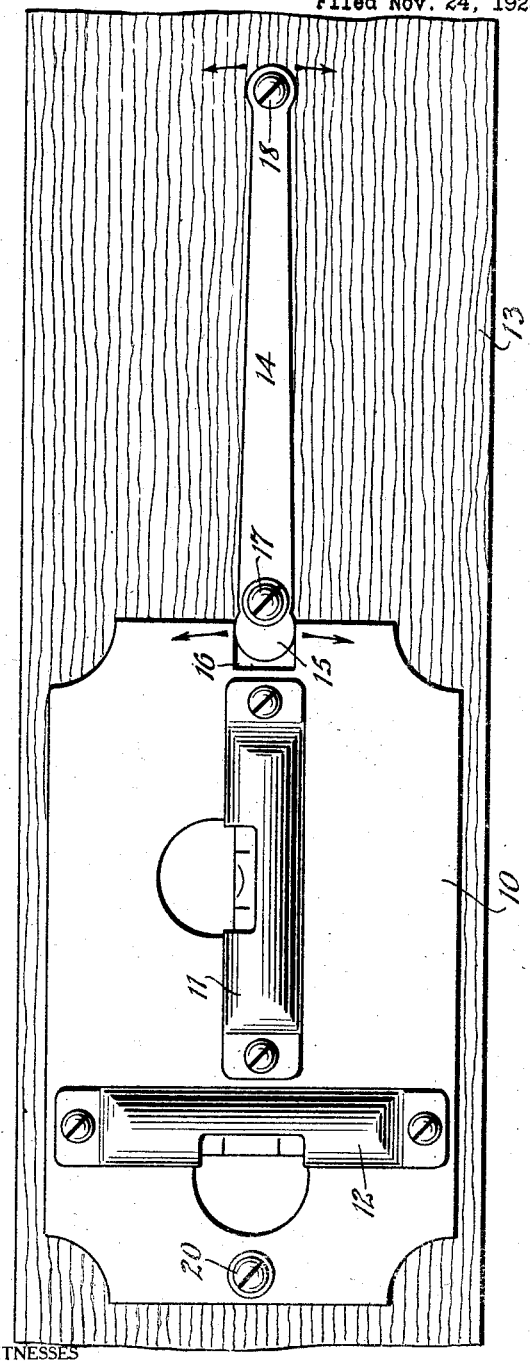
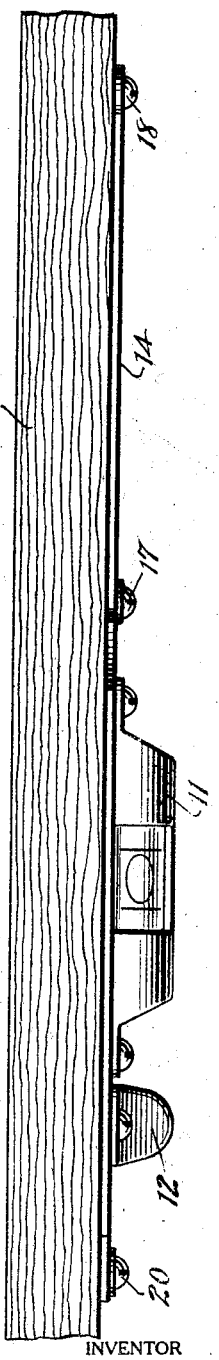
INVENTOR
Victor Edward Ivarson
BY
ATTORNEYS Patented May 24, 1927.

1,630,122

UNITED STATES PATENT OFFICE.

VICTOR EDWARD IVARSON, OF NEW ROCHELLE, NEW YORK.

SPIRIT LEVEL.

Application filed November 24, 1925. Serial No. 71,195.

My invention relates to a spirit level and more particularly to means for correcting the level.

The invention has special value as embodied in a level equipped with two level glasses at right angles to each other.

The general object of my invention is to provide an adjusting means for the level and to cause the same to function in a manner that a very fine adjustment may be obtained.

Reference is to be had to the accompanying drawings forming a part of this specification, it being understood that the drawings are merely illustrative of one example of the invention.

Figure 1 is a plan view of a level embodying my invention;

Figure 2 is a side elevation thereof.

In the illustrated example a base plate 10 is provided mounting a level 11 and a second level 12. The plate 10 is applied in the present instance to a straight edge 13 which is shown broken away at the ends.

I provide an adjusting lever 14 and provision is made for so engaging the lever with the base plate 10 that the lever may be moved in either direction for properly setting the levels 11 and 12. In the illustrated example, the short arm of lever 14 is in the form of a round head 15 and the same is received in a recess 16 in the plate 10 and lying in close contact with the side walls of said recess. The lever is fulcrumed by a screw 17 or equivalent pivot means. At that end of the longer arm of the lever 14 remote from the fulcrum 17, said lever is adapted to receive a fastening means such as a screw 18, which may be driven into the material of the straight edge 13 or other level body in any desired situation according to the adjustment made necessary. The numeral 20 indicates the pivot affording a center about which the plate 10 is adjusted.

With the described device when the fastener 18 is removed and the lever 14 is rocked, the longer arm may be moved through a considerable arc with a very slight movement of the shorter arm 15 of the lever. Thus, the plate 10 may be shifted laterally in either direction until the levels 11 and 12 are found to be correct.

After making the necessary adjustment, the fastener 18 is driven into the straight edge 13 in the new position of the outer end of the lever 14.

I would state furthermore that while the illustrated example constitutes a practical embodiment of my invention I do not limit myself strictly to the exact details herein illustrated, since, manifestly, the same can be considerably varied without departure from the spirit of the invention as defined in the appended claim.

Having thus described my invention, I claim:

In a level, a base plate having a rectangularly shaped notch therein at one end, means at the other end whereby to pivotally mount said plate on a level body, a lever, means adapted to fulcrum the same pronouncedly nearer one end than the other end to provide a longer lever arm and a shorter lever arm, said shorter arm being provided with a rounded end portion cooperating with the sides of the notch, and means adapted to detachably secure the longer arm to the level body.

VICTOR EDWARD IVARSON.